UNITED STATES PATENT OFFICE.

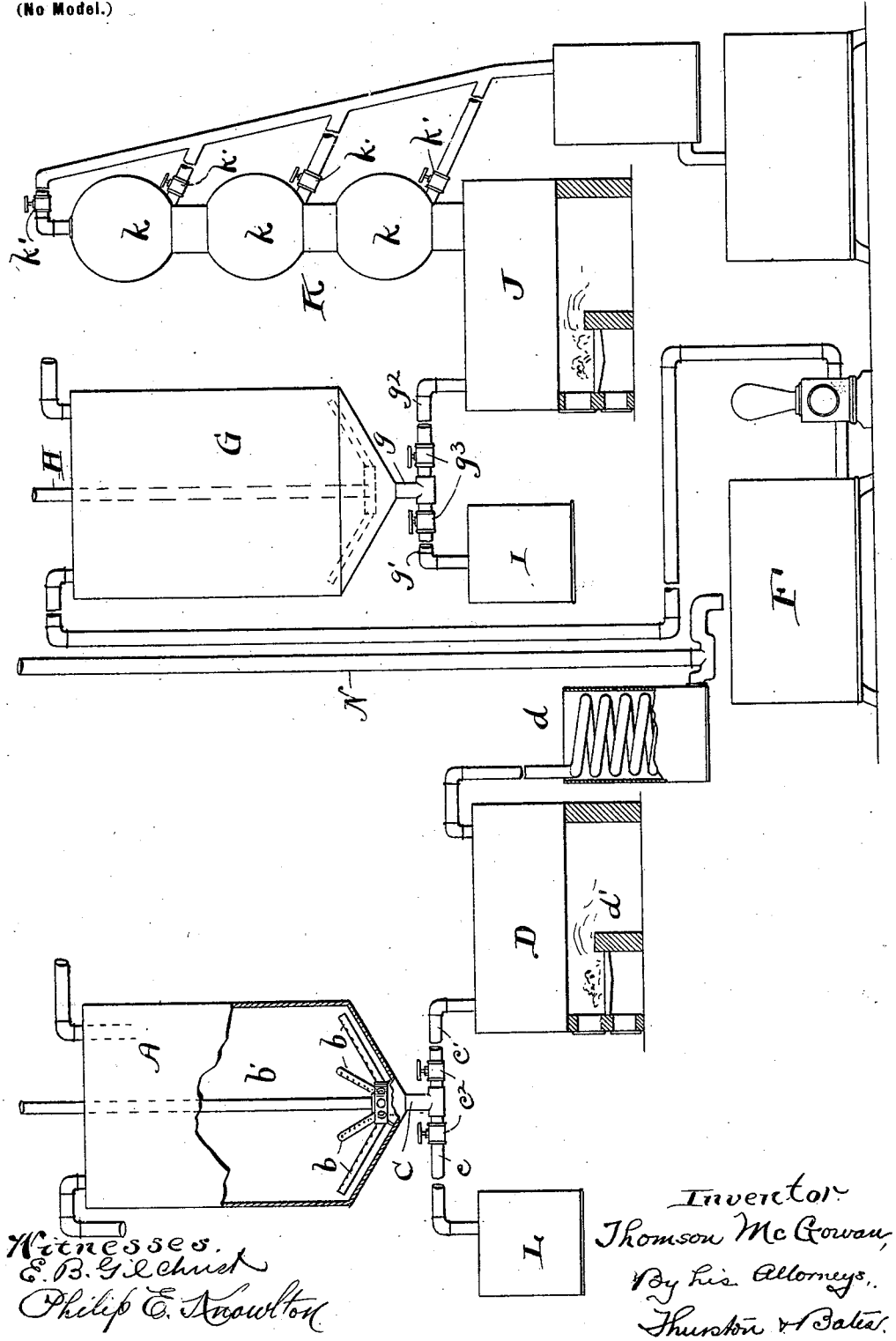

THOMSON McGOWAN, OF CLEVELAND, OHIO.

PROCESS OF DESULFURIZING PETROLEUM-OIL.

SPECIFICATION forming part of Letters Patent No. 658,857, dated October 2, 1900.

Application filed May 25, 1899. Serial No. 718,277. (No specimens.)

*To all whom it may concern:*

Be it known that I, THOMSON MCGOWAN, a citizen of the United States, residing at Cleveland, in the county of Cuyahoga and State of Ohio, have invented a certain new and useful Improvement in Processes for Desulfurizing Petroleum-Oil, of which the following is a full, clear, and exact description, reference being had to the accompanying drawing.

The petroleum-oils which are found in the Trenton rock and are commonly known as "Ohio oils" or "Lima oils" contain sulfur in combinations, which make its removal difficult. Nevertheless it is essential that it shall be substantially eliminated at some stage in the treatment of the oil and before the refined products are marketable. The processes which have heretofore been employed to produce this result have been objectionable mainly because of the large expense incident thereto.

My invention relates to a process for desulfurizing such oils, and it produces the desired results with greater completeness and at less cost than any of the processes heretofore employed.

The process consists in an admixture with the sulfurized oil prior to a distillation thereof of concentrated sulfuric acid and in then distilling the mixture of oil and acid, whereby a desulfurized distillate is obtained.

It also consists in the specific method of practicing the process hereinafter fully described—that is to say, in adding to the crude sulfurized oil the concentrated sulfuric acid, in settling and separating out the resulting precipitate or sludge and as much of the acid as will settle, and in subsequently distilling the remaining oil and so much of the acid as is held in suspension therein in the usual way. The sulfuric acid is added to the sulfurized oil and thoroughly mixed with it. The acid and the precipitate are allowed to settle and are drawn off, and the remaining oil, which contains some of the acid in suspension and which has been chemically affected by the acid in that the chemical compounds of sulfur have been rendered very unstable, is then distilled in the usual way, and substantially all of the sulfur passes off in a gas during the distillation.

In stating that the acid is added before a distillation of the oil I do not mean that the oil may not be distilled before the acid is added; but I do mean that a distillation after the addition of the acid and while some of the acid is held in suspension is an essential part of the process of desulfurization. It is preferable in the practical working of the process that the acid should not be added during the distillation and also that the oil shall not be distilled until after as much of the acid as will settle has been allowed to settle and it and the precipitated matter have been drawn off.

The drawing shows an apparatus wherewith crude petroleum-oil may be refined and desulfurized according to my invention.

Referring to the parts by letters, A represents a vessel or tank into which the oil to be desulfurized is placed. This tank may be of lead-lined metal or of any other suitable material. It has a conical bottom or a bottom so shaped that any precipitated matter may be easily removed. Into this tank concentrated sulfuric acid is delivered and thoroughly mixed with the oil. The quantity of acid which should be used depends upon the percentage of sulfur in the oil as determined by analysis. For oil containing about six-tenths of one per cent. of sulfur the best results are attained, as I believe, by using six thousand pounds of acid to fifty thousand gallons of the oil.

The thorough mixing of the oil and acid may be effected by any suitable means—as, for example, the air-agitator shown in the drawing. A plurality of perforated pipes $b$ is arranged in the bottom of the tank and is connected with a supply-pipe $b'$, through which air is blown by appropriate mechanism. After the thorough mixing of the acid and oil the acid is allowed to settle. It will carry down with it a very dark precipitate or sludge containing a large proportion of carbonaceous matter, which indicates that the oil has undergone a chemical change in the loss of some of its carbon.

A discharge-pipe C is connected with the bottom of the tank, and it has two branches $c\ c'$, each of which is provided with a stopcock $c^2$. The acid and sludge are drawn off through the branch $c$ into a suitable tank L, from which the acid is separated from the sludge and is recovered. This sludge after the acid has been removed is a valuable by-product useful for making paving material and an insulating material. The oil remaining in the tank A is then drawn off through the branch pipe $c'$. It may pass directly to a retort D or other vessel suitable for distilling it, or it may pass first to a storage-tank (not shown) and thence to the retort. The distillation of the oil is, however, the next step in the process, and this may be carried on by the usual methods—that is to say, it may be evaporated, condensed, and preserved by means of ordinary and well-known appliances—as, for example, the furnace $d'$, retort D, worm $d$, and tank F. The percentage of distillate obtained should be governed by the desired final results according to well-understood principles.

The mixture of the sulfuric acid with the oil prior to the distillation effects such a change in the sulfur compounds in the oil that they are very unstable. The result is that during the distillation which follows a very large percentage of the sulfur is eliminated and passes off in the form of sulfurous-acid gas. A stand-pipe N may be connected with the lower part of the worm-pipe, and through this stand-pipe this gas will pass. It may be recovered and then treated in the usual manner and is another valuable by-product of the process. The described process produces an oil which contains less sulfur than does oil which has been treated by any other desulfurizing process and at a very much reduced cost.

The subsequent treatment of the oil is dependent upon the final results desired. The oil from tank F may be delivered into an agitator-tank G, having a conical bottom and a branched discharge-pipe $g$, the branches $g'$ and $g^2$ having suitable stop-cocks $g^3$. A solution of plumbate of soda is added to the oil and thoroughly mixed with it by suitable means, as the air-agitator H, which is substantially like that shown in tank A and heretofore described. After this solution and the resultant precipitates have settled they are drawn off through branch pipe $g'$ and delivered into a receptacle I. The remaining oil is drawn off through the branch pipe $g^2$ and delivered either directly or indirectly to a retort J and again heated and fractionally distilled. This fractionation is best secured by a column K, connected with the retort and having a height and diameter proportioned to the retort and suitable for securing the desired results. It has a plurality of enlargements $k$ to increase the condensing-surfaces and corresponding delivery-pipes $k'$. The several fractions may be collected in separate tanks as desired. The usual methods of purification by means of concentrated sulfuric acid, water, and alkali are finally employed.

All of the process described which follows the first distillation is optional and subject to variation. The process in so far as it includes my invention does not necessarily go beyond the first distillation. It includes the mixture of concentrated sulfuric acid with the sulfurized oil in withdrawing the acid and precipitated foreign matter and in distilling the remaining resultant oil. The product of the first distillation is preferably purified by the plumbate-of-soda solution, and with some oils this or some equivalent treatment is essential. It is, however, a well-known treatment in this art for securing certain well-known results, and it produces those results more effectively with oil which has been previously treated with the sulfuric acid and then distilled than with oil that has not been so treated; but there are oils which after being desulfurized as described do not require treatment with the plumbate of soda.

The various steps which follow the desulfurization of the oil by the means described are illustrated and described for the purpose of showing that my desulfurizing process may be a part of the ordinary process for refining oils and that it adds very little to the cost of the refining process either for the apparatus or material or labor.

Having described my invention, I claim—

1. The process of desulfurizing crude Lima or like sulfurized petroleum oil, which consists in distilling a mixture of sulfuric acid with said sulfurized oil which has not been previously treated so as to change the chemical character of the sulfur compounds therein, substantially as specified.

2. The process of desulfurizing crude Lima or like sulfurized petroleum oil, which consists in agitating sulfuric acid with said oil; then allowing the mixture to settle; then segregating the oil from the precipitated sludge and so much of the acid as settles with it; and finally distilling the said sulfurized oil with so much of the acid as remains mixed with it, substantially as specified.

In testimony whereof I hereunto affix my signature in the presence of two witnesses.

THOMSON McGOWAN.

Witnesses:
E. L. THURSTON,
PHILIP E. KNOWLTON.